(12) United States Patent
Zhao

(10) Patent No.: US 8,385,744 B2
(45) Date of Patent: Feb. 26, 2013

(54) DELAY CONTROL METHOD IN PASSIVE OPTICAL NETWORK, AN OPTICAL LINE TERMINAL AND A PASSIVE OPTICAL NETWORK

(75) Inventor: Jun Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 184 days.

(21) Appl. No.: 13/036,988

(22) Filed: Feb. 28, 2011

(65) Prior Publication Data

US 2011/0150476 A1    Jun. 23, 2011

Related U.S. Application Data

(63) Continuation of application No. PCT/CN2009/071994, filed on May 26, 2009.

(30) Foreign Application Priority Data

Aug. 27, 2008 (CN) .......................... 2008 1 0146722

(51) Int. Cl.
*H04J 14/08* (2006.01)

(52) U.S. Cl. ......................................... 398/98; 398/102

(58) Field of Classification Search .............. 398/66–67, 398/98, 102
See application file for complete search history.

(56) References Cited

U.S. PATENT DOCUMENTS

| 6,728,248 | B1 | 4/2004 | Uchida et al. |
| 2005/0058452 | A1 | 3/2005 | Kramer et al. |
| 2007/0014575 | A1 | 1/2007 | Kramer et al. |
| 2008/0080562 | A1 | 4/2008 | Burch et al. |

FOREIGN PATENT DOCUMENTS

| CN | 1823547 A | 8/2006 |
| EP | 1715607 A1 | 10/2006 |
| JP | 2001-285148 | 10/2001 |
| JP | 2008-42699 | 2/2008 |

OTHER PUBLICATIONS

Extended European Search Report issued in corresponding European Patent Application No. 09809192.9, mailed Dec. 20, 2011.
Written Opinion of the International Searching Authority issued in corresponding PCT Patent Application No. PCT/CN2009/071994, mailed Sep. 3, 2009.
"Deployment of Precision Time Protocol for Synchronization of GSM and UMTS Basestations" Symmetricom, Inc. May 21, 2008.
"IEE Standard for a Precision Clock Synchronization Protocol for Networked Measurement and Control Systems" IEE Instrumentation and Measurement Society. Jul. 24, 2008.
International Search Report issued in corresponding PCT Application No. PCT/CN2009/071994; mailed Sep. 3, 2009.
Search Report issued in corresponding Chinese Patent Application No. 200810146722.2, mailed Aug. 23, 2012.

*Primary Examiner* — Leslie Pascal
(74) *Attorney, Agent, or Firm* — Brinks Hofer Gilson & Lione

(57) ABSTRACT

A method for controlling delay in a Passive Optical Network (PON) is applicable when a Precision Timing Protocol (PTP) message is transmitted in a downlink direction. The method includes obtaining a buffer duration of the PTP message destined for an Optical Network Unit (ONU), storing the PTP message destined for the ONU, and sending the PTP message to the ONU when a duration for storing the PTP message reaches the buffer duration.

16 Claims, 9 Drawing Sheets

DELAY CONTROL METHOD IN PASSIVE OPTICAL NETWORK, AN OPTICAL LINE TERMINAL AND A PASSIVE OPTICAL NETWORK

CROSS-REFERENCE TO RELATED APPLICATIONS

This application is a continuation of International Application No. PCT/CN2009/071994, filed on May 26, 2009, which claims priority to Chinese Patent Application No. 200810146722.2, filed on Aug. 27, 2008, both of which are hereby incorporated by reference in their entireties.

FIELD OF THE DISCLOSURE

The present disclosure relates to optical network technologies, and in particular, to a method for controlling delay in a Passive Optical Network (PON), an Optical Line Terminal (OLT), and an optical network unit (ONU).

BACKGROUND

Among the optical access technologies, the PON technology is promoted by service providers strongly because it reduces the Operation Expense (OPEX).

PONS are mainly categorized into Broadband Passive Optical Network (BPON), Gigabit Passive Optical Network (GPON), and Ethernet Passive Optical Network (EPON). A PON is mainly composed of network entities including an OLT, Optical Network Units (ONUs)/Optical Network Terminals (ONTs), and the like. The network entities communicate with each other by using Time Division Multiplexing (TDM)/Time Division Multiple Access (TDMA). The TDM technology is applied in a downlink direction, namely, in a communication direction from the OLT to the ONUs; and the TDMA technology is applied in an uplink direction, namely, in a communication direction from the ONUs to the OLT.

The fixed network and the mobile network converge gradually, and more multimedia service requirements arise from convergence of the telecom network, broadcast and television network, and computer communication network, the PON technology is phased into the mobile network. In the mobile network, requirements on delay are high. The Institute for Electrical and Electronic Engineers (IEEE) 1588 Precision Timing Protocol (PTP) developed by the IEEE is applied to the existing PON to meet the time synchronization requirement in the mobile network.

From a perspective of the relation between communication devices, the IEEE 1588 PTP classifies the clocks in the network into two types: Master Clock (MC) and Slave Clock (SC). Only one MC is applied in the PTP communication. The best clock in the entire network is a Grandmaster Clock (GMC).

The messages transmitted in the PTP communication include:

a PTP synchronization message (PTP_SYNC_MESSAGE);

a PTP follow-up message (PTP_FOLLOWUP_MESSAGE);

a PTP delay request message (PTP_DELAY_REQ_MESSAGE);

a PTP delay response message (PTP_DELAY_RESP_MESSAGE); and a PTP management message PTP_MANAGEMENT_MESSAGE.

A method for ensuring time synchronization between the MC and the SC by using PTP message communication in the PON is described as follows.

A prerequisite of the IEEE 1588 PTP is that the communication delay in the uplink direction is symmetrical to the communication delay in the downlink direction in the network. That is, the communication delay from the MC to the SC is equal to the communication delay from the SC to the MC.

FIG. 1 shows transparent transmission of a PTP message in the PON. Assuming that delay1 represents the communication delay in the downlink direction from the MC to the SC and delay2 represents the communication delay in the uplink direction from the SC to the MC, according to the above prerequisite, delay1=delay2.

Td1, Td2, and Td4 represent the communication delays in the downlink direction from MC to OLT, from OLT to ONU/ONT, and from ONU/ONT to SC, respectively. Td4, Td3, and Td1 represent the communication delay in the uplink direction from SC to ONU/ONT, from ONU/ONT to OLT, and from OLT to MC, respectively. In the PON, the logical distance between the OLT and the ONU/ONT has a fixed value, for example, 60 km in the GPON. In this case, the corresponding logical link delay is 600 μs, namely, Td2+Td3=600 μs.

Time offset (O) exists because the startup time of the MC is different from that of the and the oscillator incurs frequency drift. An existing method for calculating the communication delay includes the following steps:

Step S1: The MC sends a PTP_SYNC_MESSAGE to the SC at a time point TM1, and records the time point TM1 as the sending time TM1. The SC receives the PTP_SYNC_MESSAGE at a time point TS1, and records the time point TS1 as the receiving time TS1.

Step S2: The MC sends a PTP_FOLLOWUP_MESSAGE that carries the sending time flag (TM1). According to the PTP_FOLLOWUP_MESSAGE, the SC knows that TS1=TM1+O+delay1=TM1+I+(Td1+Td2+Td4).

Step S3: The SC sends a PTP_DELAY_REQ_MESSAGE to the MC at a time point TS2, and records the time point TS2 as the sending time TS2. The MC receives the PTP_DELAY_REQ_MESSAGE at a time point TM2, and records the time point TM2 as the receiving time TM2. The MC sends a PTP_DELAY_RESP_MESSAGE to the SC at the time point TM2.

Step S4: The SC receives the PTP_DELAY_RESP_MESSAGE at a time point TS3, and knows that TM2=TS2−O+delay2=TS2−O+(Td1+Td3+Td4) according to the recorded TS2 and TM2.

Therefore, according to steps S1-S4, through elimination of clock offset, the transmission delay from the MC to the SC is calculated as:

$$\text{DELAY} = [(TM2 - TS2) + (TS1 - TM1)]/2$$
$$= (Td1 + Td3 + Td4 + Td1 + Td2 + Td4)/2$$
$$= Td1 + 300 \text{ μs} + Td4.$$

In the existing method, because the delay in the uplink direction is not symmetric to the delay in the downlink direction in the PON, the communication delay in the uplink direction is much greater than the communication delay in the downlink direction, namely, Td3 is much greater than Td2. In the existing method, the calculated communication delay from the MC to the is greater than the actual delay between the MC and the SC (the actual delay is Td1+Td2+Td4), and therefore the calculated communication delay is not accurate.

SUMMARY

A method for controlling delay in a PON, includes:

obtaining a buffer duration of a Precision Timing Protocol (PTP) message transmitted in a downlink direction and destined for a receiving terminal;

storing the PTP message destined for the receiving terminal within the buffer duration; and sending the PTP message to the receiving terminal when a duration for storing the PTP message reaches the buffer duration.

An OLT includes:

a buffer duration obtaining unit, configured to obtain a buffer duration of a PTP message destined for an ONU; and a processing unit, configured to store the PTP message within the buffer duration, and send the PTP message to the ONU when a duration for storing the PTP massage reaches the buffer duration.

An ONU includes:

a protocol function unit, configured to receive messages from an OLT in a downlink direction, and obtain a PTP message from the received messages according to a PON protocol; and a storing unit, configured to store the obtained PTP message within a buffer duration of the PTP message; and forward the PTP message when a duration for storing the PTP message reaches the buffer duration.

DETAILED DESCRIPTION OF THE EMBODIMENTS

Embodiments of the present disclosure are described as follows with reference to the accompanying drawings. the present disclosure is not limited to the following descriptions. One of ordinary skill in the art, without any creative effort, is capable of deriving other embodiments of the present disclosure from the illustrated embodiments.

The embodiments of the present disclosure provide a method for controlling delay in a PON, an OLT, an ONU, and a PON, to obtain accurate communication delay. The present disclosure is applicable to all PON systems based on TDM/TDMA, including BPON, GPON, and EPON.

The embodiment using an ONU under the present disclosure can also be implemented by using an ONT. The following descriptions take a GPON as an example, it should be noted that, however, the embodiments of the present disclosure are not limited to the GPON.

Figure 1:
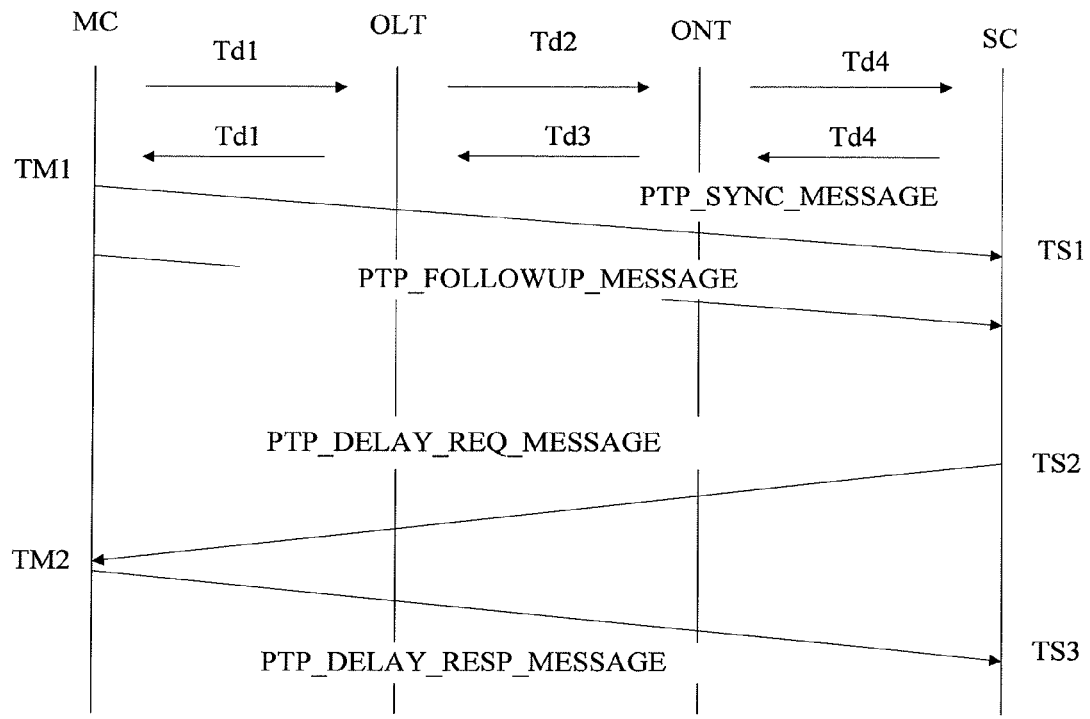
FIG. 1 shows transparent transmission of a PTP message in a PON.
Figure 2:
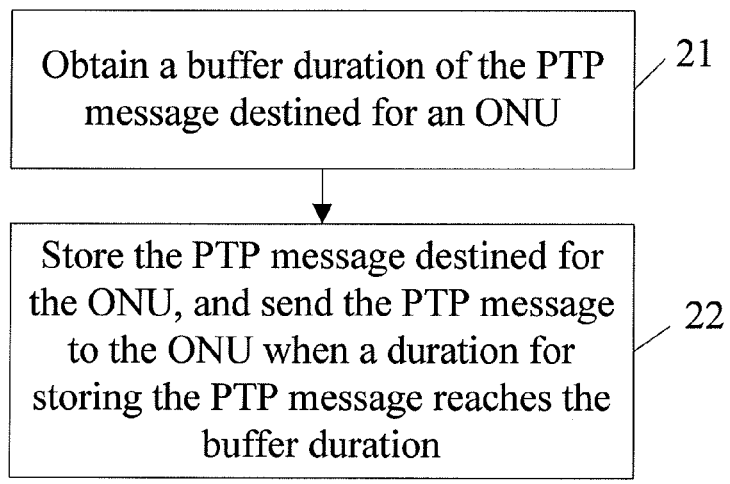
FIG. 2 is a flowchart of a method for controlling delay in a PON according to a first embodiment of the present disclosure.

A method for controlling delay in a PON is provided in a first embodiment of the present disclosure. The method is applicable when a PTP message is transmitted in a downlink direction. As shown in FIG. 2, the method includes the following steps:

Step 21: a buffer duration of the PTP message destined for an ONU is obtained.

Step 22: the PTP message destined for the ONU is stored, and when a duration for storing the PTP message reaches the buffer duration, the PTP message is sent to the ONU.

According to the first embodiment, in the downlink direction, the PTP message is stored within the obtained buffer duration, thus compensating for the downlink delay.

Figure 3:
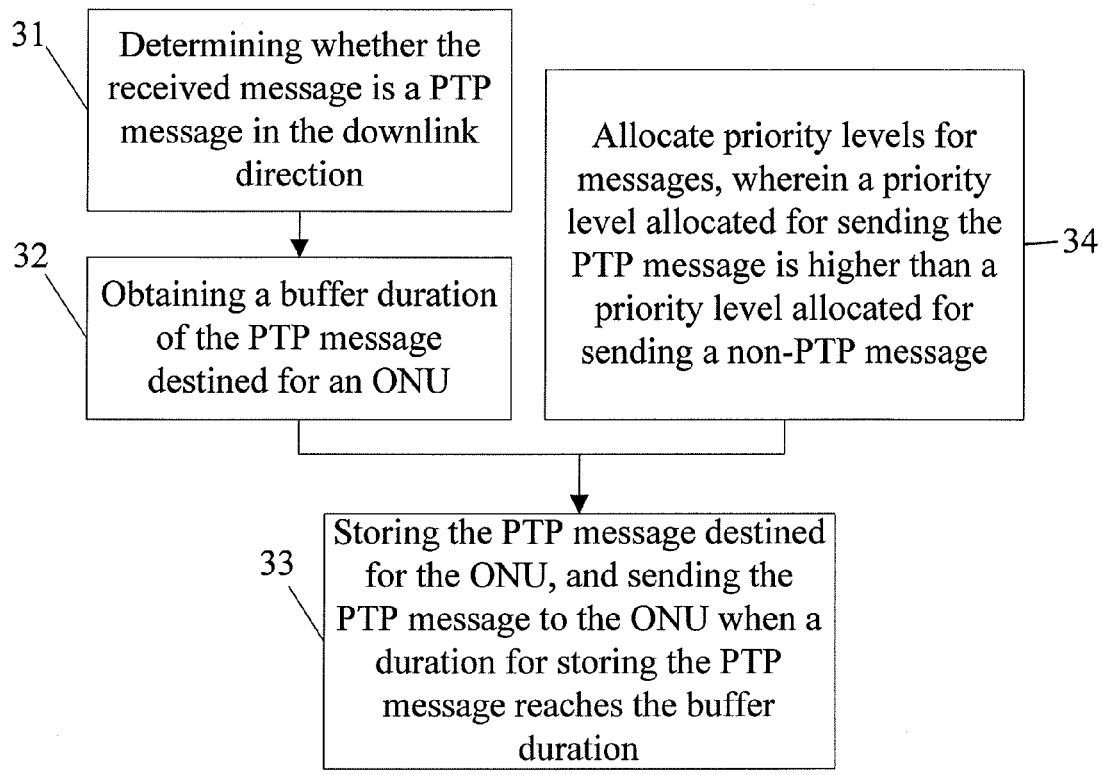
FIG. 3 is a flowchart of a method for controlling delay in a PON according to a second embodiment of the present disclosure.

FIG. 3 shows a method for controlling delay in a PON according to a second embodiment of the present disclosure. The method includes the following steps:

Step 31: in a downlink direction, whether the received message is a PTP message is determined.

An identifier may be configured in the PTP message so as to implement the determining process in step 31. As such, the determining of whether the received message is a PTP message can be performed based on the identifier.

If the received message is a non-PTP message, the non-PTP message is processed as in the existing technique, which is not detailed herein.

Step 32: a buffer duration of the PTP message destined for an ONU is obtained.

The method for controlling delay in the PON provided in the second embodiment of the present disclosure can be implemented by an OLT in the PON.

In this case, step 32 is specified as the OLT receives a buffer duration instruction, or the OLT obtains a buffer duration dynamically.

The buffer duration instruction can be sent to the OLT by use of an Element Management System (EMS). The buffer duration instruction indicates the buffer duration of the PTP message in different receiving terminals connected to the OLT. Many factors in the network may be taken into account in setting this buffer duration in order to ensure that the buffer duration is more reasonable.

Alternatively, the OLT may obtain the buffer duration dynamically. Specifically, the OLT obtains an actual loop delay of the ONU by performing a ranging operation on the ONU, and obtains the buffer duration of the ONU based on the actual loop delay. The buffer duration is difference between the logical loop delay and the actual loop delay, and can be expressed as:

$$\text{buffer duration } T = \text{logical loop delay} - 2 \times \text{downlink delay } i \quad (1)$$
$$= \text{logical loop delay} - \text{actual loop delay } i$$

According to the GPON standard, the logical loop delay is 600 μs. The downlink delay i is a downlink delay from the OLT to an $i^{th}$ ONU, and the actual loop delay i is an actual loop delay from the $i^{th}$ ONU to the OLT, which can be obtained by performing a ranging operation on the $i^{th}$ ONU.

Step 33: the PTP message destined for the ONU is stored, and when a duration for storing the PTP message reaches the buffer duration, the PTP message is sent to the ONU.

The buffer duration obtained according to the foregoing method is a time difference between the uplink delay and the downlink delay. The foregoing method compensated for the delay in the downlink direction by the time difference, and therefore, symmetry of delay between the uplink direction and the downlink direction is ensured.

In the second embodiment of the present disclosure, the OLT serves as an entity for implementing delay compensation in the downlink direction. Taking the GPON as an example, when the delay is compensated for in the downlink direction according to the foregoing description, if the entity for implementing the compensation is an OLT, the OLT would process the PTP message according to the GPON protocol after the delay compensation. For example, the OLT encapsulates the PTP message according to the GPON Encapsulation Method (GEM) and frames the PTP message, and sends the processed PTP message to the ONU.

In the second embodiment, the method may further include the following steps:

Step 34: priority levels are allocated for messages, wherein a priority level allocated for sending the PTP message is higher than a priority level allocated for sending a non-PTP message.

By setting the priority levels, the PTP message can be sent immediately upon expiry of the buffer duration, without any extra waiting delay.

According to the second embodiment, in the downlink direction, the PTP message is stored within the obtained buffer duration, thus compensating for the downlink delay.

Figure 4:
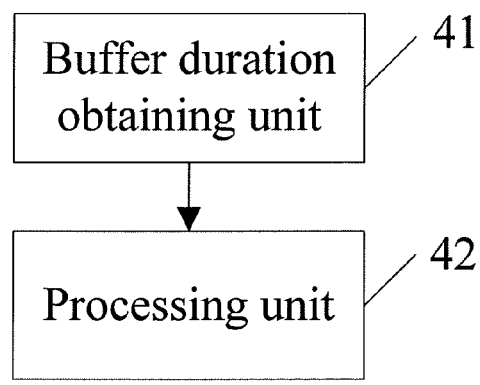
FIG. 4 shows a structure of an OLT according to a third embodiment of the present disclosure.

An OLT is provided in a third embodiment of the present disclosure. As shown in FIG. 4, the OLT includes:

a buffer duration obtaining unit 41, configured to obtain a buffer duration of a PTP message destined for an ONU; and a processing unit 42, configured to store the PTP message, and send the PTP message to the ONU when a duration for storing the PTP message reaches the buffer duration.

According to the third embodiment, in the downlink direction, the PTP message is stored within the obtained buffer duration, thus compensating for the downlink delay.

Moreover, the OLT may further include:

a priority allocating unit, configured to allocate priority levels for messages, wherein a priority level allocated for sending the PTP message is higher than a priority level allocated for sending a non-PTP message.

Details of the above-mentioned functional modules/units in the OLT may be found in the description above with respect to the method embodiment.

Figure 5:
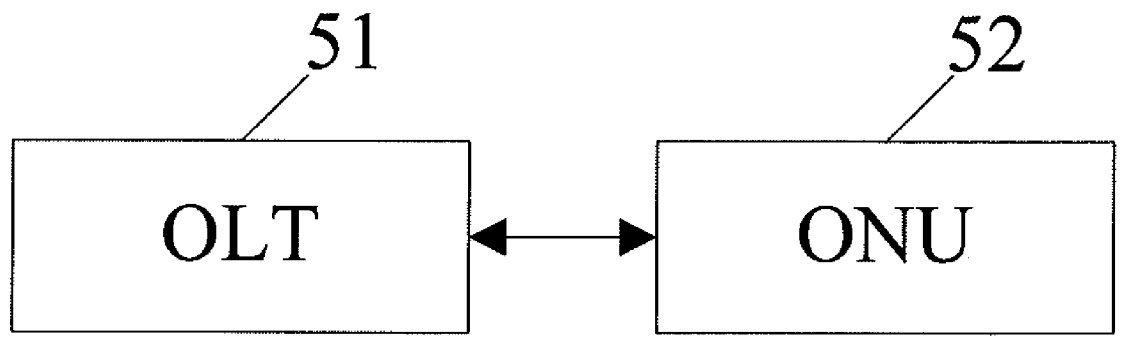
FIG. 5 shows a structure of a PON according to a fourth embodiment of the present disclosure.

Referring to FIG. 5, a PON is provided in a fourth embodiment of the present disclosure. The PON includes an OLT 52 and an ONU 52;

the OLT 51 is configured to obtain a buffer duration of a PTP message destined for the ONU 52 in a downlink direction, store the PTP message and send the PTP message processed according to a PON protocol to the ONU 52 when a duration for storing the PTP message reaches the buffer duration; and the ONU 52 is configured to receive messages from the OLT 51, obtain the PTP message from the received message according to a PON protocol, and send the obtained PTP message to an SC.

Figure 6:
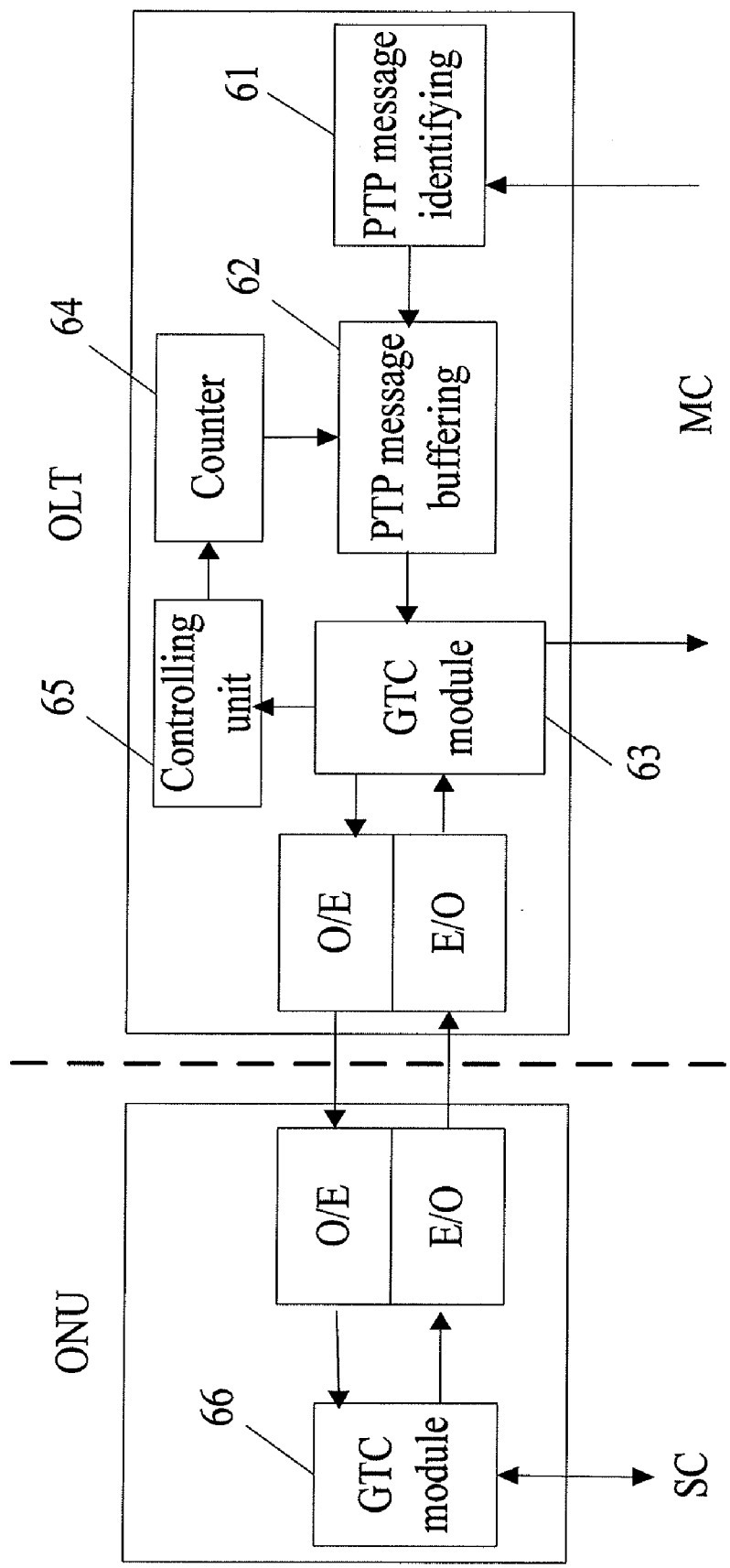
FIG. 6 shows a structure of a GPON according to the fourth embodiment of the present disclosure.

FIG. 6 shows a network structure of a GPON. In the GPON, the OLT includes: a PTP message identifying module 61, a PTP message buffering module 62, a GPON Transmission Convergence layer (GTC) module 63, a counter 64, a controlling unit 65, an Optical to Electrical (O/E) converting module, and an Electrical to Optical (E/O) converting module.

The ONU includes a GTC module 66, an O/E converting module, and an E/O converting module.

The PTP message identifying module 61 in the OLT receives messages from an MC, and determines whether a PTP message is included in the received messages. If a PTP message is included, the PTP message identifying module 61 sends the PTP message to the PTP message buffering module 62. The counter 64 and the controlling unit 65 cooperatively buffer the PTP message within a preset buffer duration. After completion of the buffering, the PTP message buffering module 62 sends the PTP message to the GTC module 63 for GEM encapsulation and framing. After an O/E conversion is performed on the PTP message, the PTP message is sent to the ONU in the downlink direction.

The GTC module 63 is further configured to allocate priority levels for the messages to make a priority level allocated for sending the PTP message is higher than a priority level allocated for sending a non-PTP message. By setting the priority levels, the PTP message can be sent immediately upon expiry of the buffer duration, without any extra waiting delay. Therefore, the accuracy of the downlink delay compensation is ensured.

According to the technical fourth embodiment, in the downlink direction, the PTP message is stored within the obtained buffer duration, thus compensating for the downlink delay.

Figure 7:
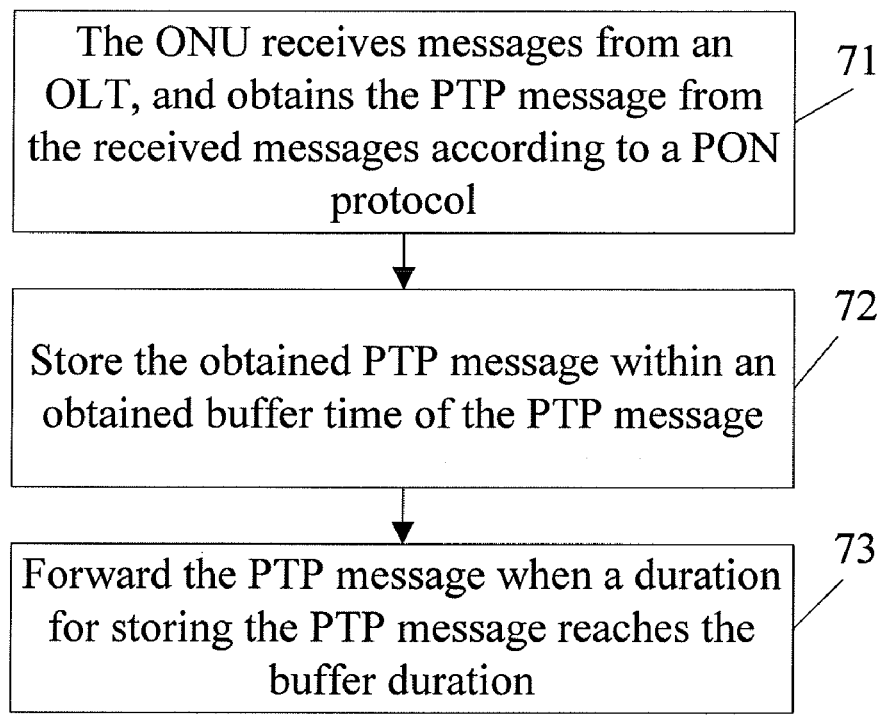
FIG. 7 is a flowchart of a method for controlling delay in a PON according to a fifth embodiment of the present disclosure.

Referring to FIG. 7, a method for controlling delay in a PON is provided in a fifth embodiment of the present disclosure. The method is applicable when a PTP message is transmitted in a downlink direction. As shown in FIG. 7, the method includes the following steps:

Step 71: an ONU receives messages from an OLT, and obtains a PTP message from the received messages according to a PON protocol.

In the GPON, the ONU obtained the PTP message according to the GTC protocol.

Step 72: The ONU stores the received PTP message within an obtained buffer duration of the PTP message.

Step 73. The ONU forwards the PTP message when a duration for storing the PTP message reaches the buffer duration.

In the fifth embodiment, the buffer duration of the PTP message is acquired by the OLT and sent to the ONU, and the ONU stores the PTP message within the buffer duration, such that the delay in the downlink direction is compensated for by a cooperation of the OLT and the ONU.

The buffer duration can be obtained by the ONU at least in the following method:

In a first method, the ONU obtains the buffer duration by receiving a buffer duration instruction.

An EMS may be used as a controller to send a buffer duration instruction to the ONU directly. The buffer duration instruction indicates the buffer duration of the PTP message in the ONU. Many factors in the network may be taken into account in setting the buffer duration in order to ensure the buffer duration to be more reasonably.

In a second method, the ONU obtains the buffer duration from a Physical Layer Operation Administration Maintenance (PLOAM) message sent by the OLT. In the second method, two application scenarios may be provided.

In a first scenario, the OLT identifies and buffers the PTP message. A buffer delay of the PTP message within the OLT is buffer delay i.

In this case, the OLT obtains the actual loop delay i from an $i^{th}$ ONU to the OLT, by performing a ranging operation on the $i^{th}$ ONU. Based on the buffer delay i and the actual loop delay i, the OLT can further obtain the buffer duration of this receiving terminal (i.e., the $i^{th}$ ONU). The buffer duration is a difference between the logical loop delay and a sum of the buffer delay i and the actual loop delay i, and the buffer duration carried in the PLOAM message can be expressed as:

$$\text{buffer duration } T = \text{logical loop delay} - \text{actual loop delay } i - \text{buffer delay } i \quad (2)$$

According to the GPON standard, the logical loop delay is 600 μs. The actual loop delay i is a delay from the OLT to the receiving terminal (the $i^{th}$ ONU), and can be obtained by performing a ranging operation on the ONU. The buffer delay i is a duration for buffering the PTP message destined for the $i^{th}$ ONU within the OLT.

The buffer delay i is desired to be less than the difference between the logical loop delay and the actual loop delay i. In practice, for reasons such as scheduling, the duration for buffering the PTP message within the OLT may be greater than this difference, in this situation, the PTP message would be discarded.

Formula (2) for calculating the buffer duration in the fifth embodiment of the present disclosure takes the duration for storing the PTP message within the OLT into consideration, therefore the obtained buffer duration is more accurate. Particularly, for reasons such as scheduling, when the duration for buffering the PTP message within the OLT exceeds a delay offset threshold (e.g., 1.5 μs) of the mobile network, the buffer duration obtained through formula (2) ensures a transmission synchronization requirement of the mobile bearer is met.

When the duration for storing the PTP message within the OLT is less than the delay offset threshold (e.g., 1.5 μs) of the mobile network, in the technical solution provided in the fifth embodiment of the present disclosure, the buffer duration may be obtained according to the following formula:

$$\text{buffer duration } T = \text{logical loop delay} - \text{actual loop delay } i.$$

In a second scenario, the OLT does not buffer the PTP message.

In this case, the OLT obtains the actual loop delay of the ONU by performing a ranging operation on the ONU. Based on the actual loop delay, the OLT obtains the buffer duration of the PTP message in the ONU. The buffer duration is a difference between the logical loop delay and the actual loop delay, and is expressed as:

$$\text{buffer duration } T = \text{logical loop delay} - 2 \times \text{downlink delay } i \quad (3)$$
$$= \text{logical loop delay} - \text{actual loop delay } i$$

According to the GPON standard, the logical loop delay is 600 μs. The downlink delay i is a delay from the OLT to the $i^{th}$ ONU. The actual loop delay i is the actual loop delay from the $i^{th}$ ONU to the OLT, and may be obtained by performing a ranging operation on the ONU.

The followings describe how the buffer duration is carried in the PLOAM message.

The PLOAM message includes one or more buffer duration indication field. The buffer duration indication field indicates the buffer duration of the PTP message in the ONU. The buffer duration indication field may be set in the PLOAM message according to the following two modes:

Mode 1: A PLOAM message includes one buffer duration indication field, as shown in Table 1.

Six bytes (from byte i to byte i+5, where i is a sequence number) are selected in the PLOAM message as a buffer duration indication field.

TABLE 1

| SN of byte | Content    | Description                                             |
|------------|------------|---------------------------------------------------------|
| 1          | ONU/OLT ID | Address of ONU/OLT                                      |
| 2          | Message ID | Identifier of PLOAM message                             |
| ...        |            |                                                         |
| i          | dddddddd   | Highest significant bit of the buffer duration indication bit |
| i + 1      | dddddddd   |                                                         |
| i + 2      | dddddddd   |                                                         |
| i + 3      | dddddddd   |                                                         |
| i + 4      | dddddddd   |                                                         |
| i + 5      | dddddddd   | Lowest significant bit of the buffer duration indication bit |
| ...        | rrrrrrrr   | Reserved                                                |
| 12         | rrrrrrrr   | Reserved                                                |
| 13         | CRC        | Check byte                                              |

The PLOAM message indicates the buffer duration of the PTP message in only one ONU/ONT.

Mode 2: A PLOAM message includes a plurality of buffer duration indication fields. Table 2 shows a structure of a PLOAM message that includes two buffer duration indication fields. The two buffer duration indication fields indicate a buffer duration of a first PTP message in a first ONU and a buffer duration of a second PTP message in a second ONU respectively, and each buffer duration indication field includes 4 bytes.

TABLE 2

| SN of byte | Content    | Description                                             |
|------------|------------|---------------------------------------------------------|
| 1          | Message ID | Addresses of all ONU/ONTs                               |
| 2          | ONU ID 1   | Identifier of PLOAM message                             |
| 3          | dddddddd   | Address of the first ONU/ONT                            |
| 4          | dddddddd   | Highest significant bit of the buffer duration indication bit |
| 5          | dddddddd   |                                                         |
| 6          | dddddddd   |                                                         |
| 7          | ONU ID 2   | Lowest significant bit of the buffer duration indication bit |
| 8          | dddddddd   | Address of the second ONU/ONT                           |
| 9          | dddddddd   | Highest significant bit of the buffer duration indication bit |
| 10         | dddddddd   |                                                         |
| 11         | dddddddd   |                                                         |
| 12         | CRC        | Lowest significant bit of the buffer duration indication bit |
| 13         |            | Check byte                                              |

Table 2 shows only 13 bytes related to the two buffer duration indication fields. In practice, other buffer duration indication fields and control bytes may be included in the PLOAM message.

In Mode 2, the PLOAM message is configured as a multicast message, and can implement delay control on two PTP messages concurrently.

In the fifth embodiment, the configuration of the buffer duration indication field in the PLOAM message is not limited to the two modes above, for example, a PLOAM message may include more than one buffer duration indication field.

Mode 3: The buffer duration of the PTP message is encapsulated in a GEM frame that the PTP message is within, and the buffer duration of the PTP message can be obtained through decapsulating the GEM frame.

The buffer duration may be encapsulated into the PTP message and sent to the ONU by the OLT. In the GPON, the buffer duration can be encapsulated in the GEM frame that the PTP message is within through GEM encapsulation. While sending the PTP message, the buffer duration of the PTP message would be sent along with the PTP message to the ONU.

Figure 8:
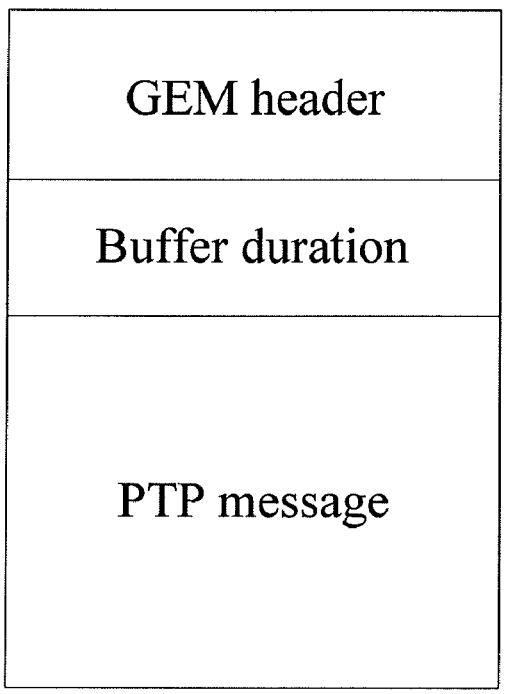
FIG. 8 shows an encapsulation of buffer duration according to the fifth embodiment of the present disclosure.

FIG. 8 shows a GEM encapsulation according to the fifth embodiment of the present disclosure. The buffer duration is encapsulated in a payload of the GEM frame. In practice, the encapsulation of the buffer duration is not limited to the above-mentioned GEM encapsulation, other encapsulations may be employed for the buffer duration, for example, the buffer duration may be carried in the PTP message through a general encapsulation mode.

Figure 9:
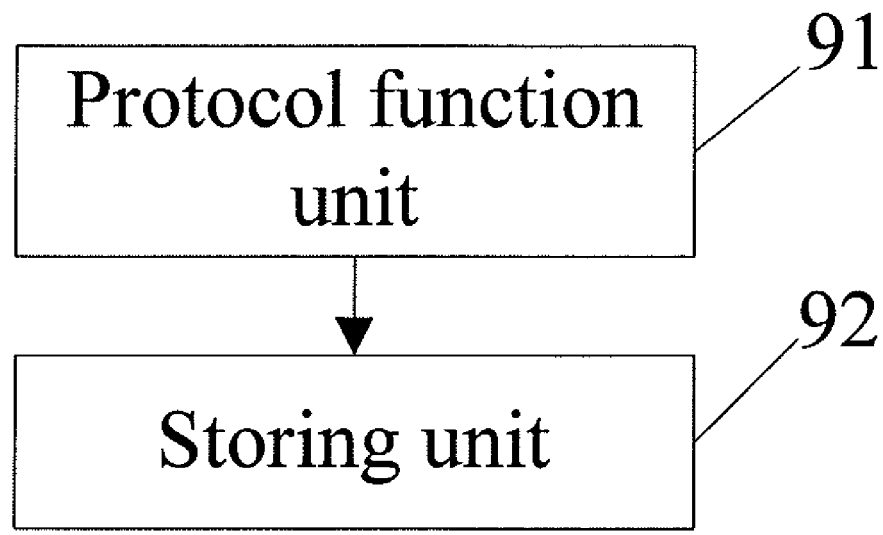
FIG. 9 shows a structure of an ONU according to a sixth embodiment of the present disclosure.

Referring to FIG. 9, an ONU according to a sixth embodiment of the present disclosure is provided. The ONU includes:

a protocol function unit 91, configured to receive messages from an OLT in a downlink direction, and obtain a PTP message from the received messages according to a PON protocol; and a storing unit 92, configured to store the obtained PTP message within a buffer duration of the PTP message, and forward the PTP message when a duration for storing the PTP message reaches the buffer duration.

The ONU may further include:

a buffer duration obtaining unit, which is configured to obtain the buffer duration of the PTP message from a GEM frame or a PLOAM message received from the OLT; alternatively, to obtain the buffer duration of the PTP message according to a received buffer duration instruction.

Details of the above functional modules/units in the ONU may be found in the descriptions above with respect to the method embodiments.

According to the ONU provided in the sixth embodiment, in the downlink direction, the PTP message is stored within the obtained buffer duration, thus compensating for the downlink delay.

Figure 10:
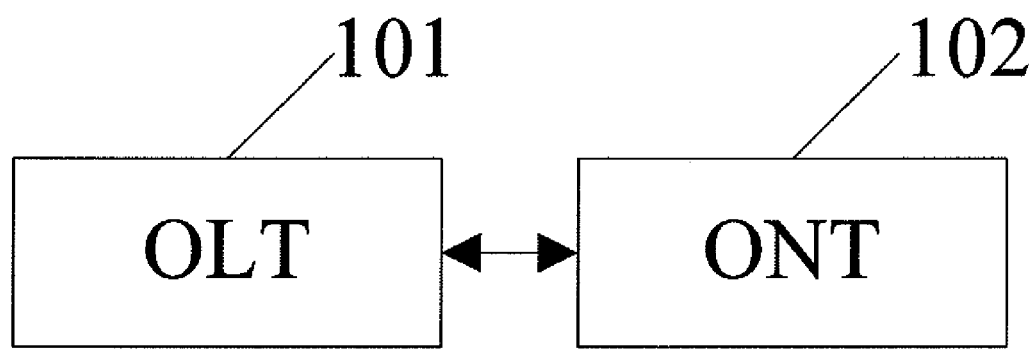
FIG. 10 shows a PON according to a seventh embodiment of the present disclosure.

Referring to FIG. 10, a PON is provided in a seventh embodiment of the present disclosure. As shown in FIG. 10, the PON includes an OLT 101 and an ONU 102;

the OLT 101 is configured to identify and buffer a PTP message, and send the PTP message to an ONU 102; and the ONU 102 is configured to receive the PTP message from the OLT 101 and store the PTP message according to a buffer duration of the PTP message in the ONU 102, and send the PTP message to an SC when a duration for storing the PTP message reaches the buffer duration.

In the following description, GPON is taken as an example to illustrate the PON as provided in the seventh embodiment of the present disclosure.

Figure 11:
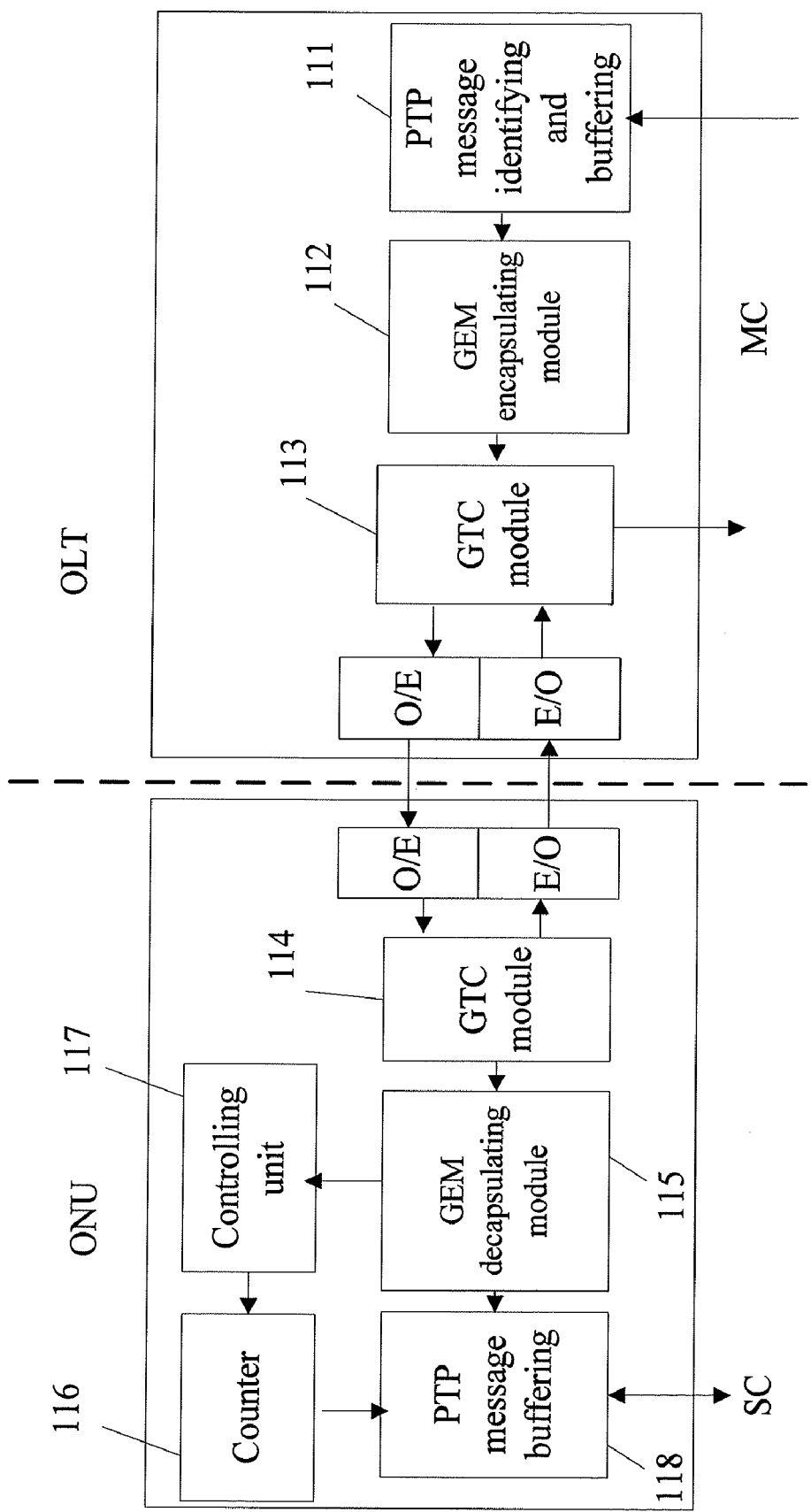
FIG. 11 shows a structure of a GPON according to a seventh embodiment of the present disclosure.

FIG. 11 shows a structure of a GPON. In the GPON, the OLT includes: a PTP message identifying and buffering module 111, a GEM encapsulating module 112, a GTC module 113, an O/E converting module, and an E/O converting module. The ONU includes a GTC module 114, a GEM decapsulating module 115, a counter 116, a controlling unit 117, a PTP message buffering module 118, an O/E converting module, and an E/O converting module.

After the OLT receives messages from an MC, the PTP message identifying and buffering module 111 identifies a PTP message and buffers the PTP message. The OLT further obtains a buffer duration of the PTP message for buffering in the ONU, and the GEM encapsulating module 112 encapsulates the buffer duration into the PTP message. The GTC module 113 performs protocol processing on the encapsulated PTP message, and sends the encapsulated PTP message to the ONU in the downlink direction after E/O conversion is performed on the encapsulated PTP message.

The ONU performs O/E conversion on the received PTP message, and then the GTC module 114 performs GPON protocol processing on the PTP message other than decapsulation. The GEM decapsulating module 115 obtains the buffer duration of the PTP message through decapsulation, and the controlling unit 117 and the counter 116 cooperatively control the decapsulated PTP message to be stored in the PTP message buffering module 118. When a duration for storing the PTP message reaches the buffer duration, the PTP message is sent to an SC.

Figure 12:
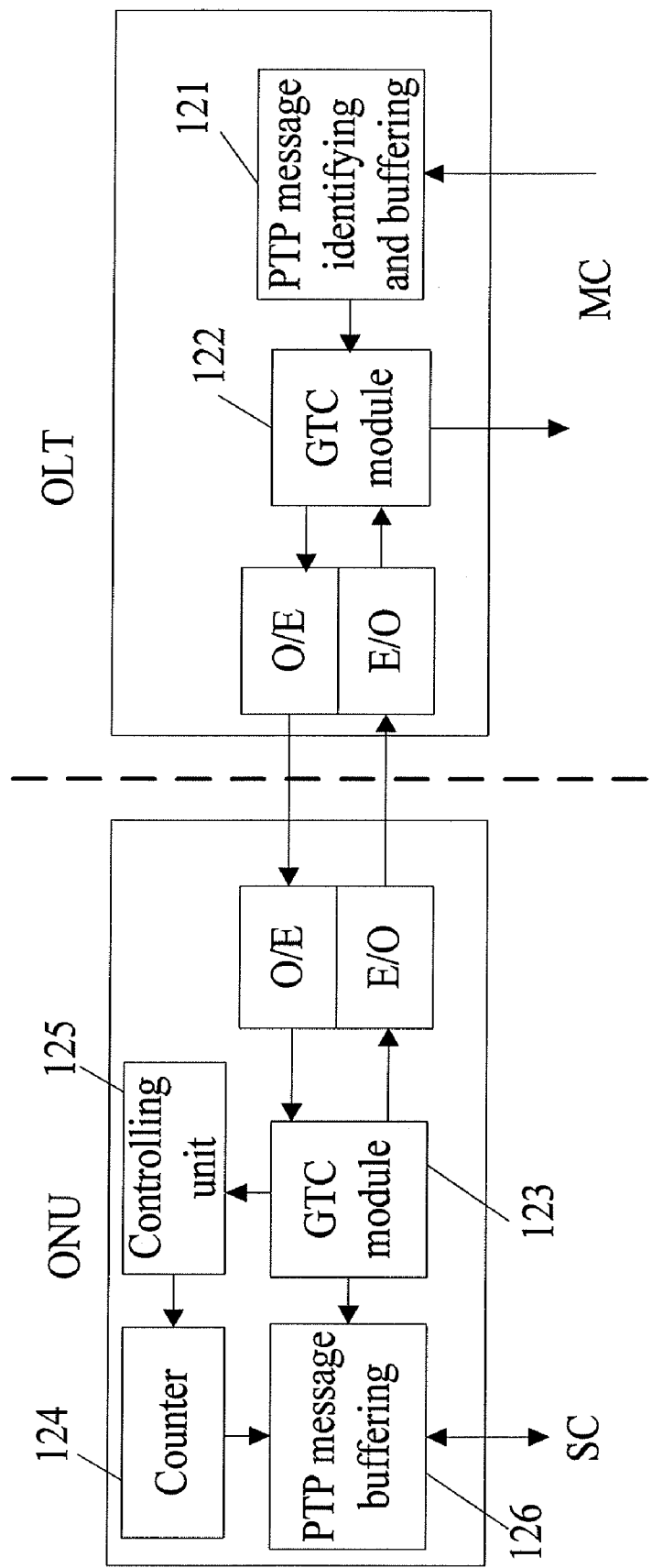
FIG. 12 shows a structure of another GPON according to the seventh embodiment of the present disclosure.

FIG. 12 shows a structure of another GPON. In the GPON, the OLT includes: a PTP message identifying and buffering module 121, a GTC module 122, an O/E converting module, and an E/O converting module.

The ONU includes a GTC module 123, a counter 124, a controlling unit 125, a PTP message buffering module 126, an O/E converting module, and an E/O converting module.

After the OLT receives messages from an MC, the PTP message identifying and buffering module 121 identifies the PTP message and buffers the PTP message. The OLT further obtains a buffer duration of the PTP message for buffering in the ONU, bears the buffer duration into a PLOAM message, and sends the PLOAM message to the ONU. The GTC module 122 performs protocol processing on the PTP message, performs E/O conversion and then sends the PTP message to the ONU in the downlink direction.

The ONU performs O/E conversion for the received PTP message, and then the GTC module 123 performs GPON protocol processing on the PTP message. According to the buffer duration carried in the PLOAM message, the controlling unit 117 and the counter 116 cooperatively control the PTP message to be stored in the PTP message buffering module 118. When a duration for storing the PTP message reaches the buffer duration, the PTP message is sent to an SC.

Figure 13:
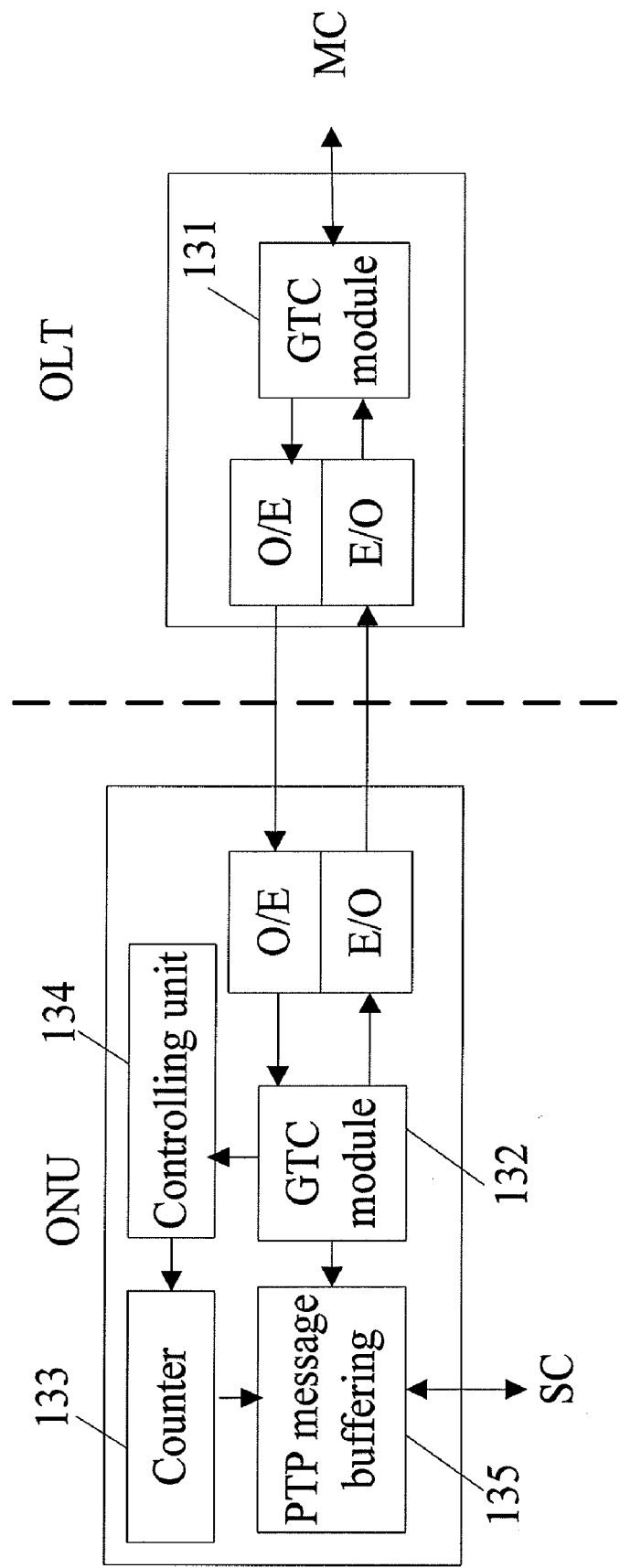
FIG. 13 shows a structure of another GPON according to the seventh embodiment of the present disclosure.

FIG. 13 shows a structure of yet another GPON according to the seventh embodiment of the present disclosure. In the GPON, the OLT includes: a GTC module 131, an O/E converting module, and an E/O converting module.

The ONU includes a GTC module 132, a PTP message identifying and buffering module 135, a counter 133, a controlling unit 134, an O/E converting module, and an E/O converting module.

In the network as shown in FIG. 13, the PTP message is identified and buffered by the PTP message identifying and buffering module 135 in the ONU. In detail, the OLT may send an obtained buffer duration along with a PLOAM message to the ONU. The controlling unit 134 and the counter 133 in the ONU cooperatively control the PTP message to be stored in the PTP message identifying and buffering module 135. When a duration for storing the PTP message reaches the buffer duration, the PTP message is sent to an SC.

According to the PON provided in this embodiment, in the downlink direction, the PTP message is stored within the obtained buffer duration, thus compensating for the downlink delay.

It should be noted that although the foregoing embodiments take the ONU as an example, the functions of the ONU may be implemented by an ONT instead.

Persons of ordinary skill in the art understand that all or part of the steps of the method in the embodiments of the present disclosure may be implemented by relevant hardware that is instructed by program. The program may be stored in a computer readable storage medium such as read-only memory (ROM)/random access memory (RAM), magnetic disk or CD-ROM.

The above descriptions are merely preferred embodiments of the present disclosure, and not intended to limit the scope of the present disclosure. Any modifications, variations or replacement that can be easily derived by those skilled in the art shall fall within the scope of the present disclosure. Therefore, the protection scope of the present disclosure is subject to the appended claims.

What is claimed is:

1. A method for controlling delay in a Passive Optical Network (PON), comprising:
   obtaining, by an optical line terminal (OLT), a buffer duration of a Precision Timing Protocol (PTP) message transmitted in a downlink direction and destined for an optical network unit (ONU);
   storing, by the OLT, the PTP message within the buffer duration; and
   sending, by the OLT, the PTP message to the ONU when a duration for storing the PTP message reaches the buffer duration.

2. The method for controlling delay in a PON according to claim 1, further comprising:
   allocating, by the OLT, priority levels for messages, wherein a priority level allocated for sending the PTP message is higher than a priority level allocated for sending a non-PTP message.

3. The method for controlling delay in a PON according to claim 1, wherein the obtaining a buffer duration of the PTP message transmitted in a downlink direction and destined for the ONU comprises:
   receiving, by the OLT, a buffer duration instruction from an element management system, wherein the buffer duration instruction is configured to indicate the buffer duration of the PTP message destined for the ONU.

4. The method for controlling delay in a PON according to claim 1, wherein the obtaining a buffer duration of the PTP message transmitted in a downlink direction and destined for the ONU comprises:
   obtaining, by the OLT, an actual loop delay of the ONU by performing a ranging operation on the ONU; and
   calculating, by the OLT, a buffer duration of the PTP message according to the actual loop delay, wherein the buffer duration is a difference between a logical loop delay of the PON and the actual loop delay.

5. A method for controlling delay in a Passive Optical Network (PON), comprising:
   receiving, an optical network unit (ONU), downlink messages from an optical line terminal (OLT);
   obtaining, by the ONU, a Precision Timing Protocol (PTP) message from the received downlink messages according to a PON protocol;
   obtaining, by the ONU, a buffer duration of the PTP message;
   storing, by the ONU, the PTP message within the buffer duration; and
   sending, by the ONU, the PTP message to a slave clock when a duration for storing the PTP message reaches the buffer duration.

6. The method for controlling delay in a PON according to claim 5, wherein the buffer duration and the PTP message are encapsulated in a GPON Encapsulation Method (GEM) frame sent to the ONU, and the obtaining, by the ONU, a buffer duration of the PTP message comprises:
   decapsulating, by the ONU, the GEM frame sent to the ONU to obtain the buffer duration of the PTP message.

7. The method for controlling delay in a PON according to claim 5, wherein the buffer duration is carried in a buffer duration indication field of a Physical Layer Operation Administration Maintenance (PLOAM) message sent to ONU, and the obtaining, by the ONU, a buffer duration of the PTP message comprises:
   obtaining, by the ONU, the buffer duration from the buffer duration indication field of the PLOAM message.

8. The method for controlling delay in a PON according to claim 7, wherein the PTP message is buffered in the OLT for a buffer delay before being sent to the ONU, and the buffer duration of the PTP message carried in the PLOAM message comprises a difference between a logical loop delay of the PON and a sum of the buffer delay of the OLT and an actual loop delay of the ONU when the buffer delay is greater than a predetermined delay offset threshold.

9. The method for controlling delay in a PON according to claim 8, wherein the buffer duration of the PTP message carried in the PLOAM message comprises a difference between a logical loop delay of the PON and an actual loop delay of the ONU when the buffer delay is less than a predetermined delay offset threshold.

10. The method for controlling delay in a PON according to claim 7, wherein the PTP message is not buffered in the OLT before being sent to the ONU, and the buffer duration of the PTP message carried in the PLOAM message comprises a difference between a logical loop delay of the PON and an actual loop delay of the ONU.

11. An Optical Line Terminal (OLT), comprising:
    a buffer duration obtaining unit, configured to obtain a buffer duration of a Precision Timing Protocol (PTP) message destined for an Optical Network Unit (ONU), the buffer duration indicates a time length for buffering the PTP message at the OLT before being sent to the ONU; and
    a processing unit, configured to store the PTP message at the OLT within the buffer duration, and send the PTP message to the ONU when a duration for storing the PTP message reaches the buffer duration.

12. The OLT according to claim 11, further comprising:
    a priority allocating unit, configured to allocate priority levels for messages, wherein a priority level allocated for sending the PTP message is higher than a priority level allocated for sending a non-PTP message.

13. The OLT according to claim 11, wherein the buffer duration obtaining unit obtains the buffer duration by calculating a difference between a logical loop delay of a passive optical network (PON) in which the OLT is located and an actual loop delay of the ONU.

14. The OLT according to claim 11, wherein the processing unit is further configured to calculate a duration of the PTP message for buffering in the ONU, bear the calculated duration of the PTP message for buffering in the ONU in a Physical Layer Operation Administration Maintenance (PLOAM) message and send the PLOAM message to the ONU.

15. The OLT according to claim 14, wherein the calculated duration carried in the PLOAM message comprises a difference between a logical loop delay of the PON and a sum of a buffer delay of the OLT and an actual loop delay of the ONU when the buffer delay is greater than a predetermined delay offset threshold, wherein the buffer delay of the OLT is substantially equal to the duration for storing the PTP message in the processing unit.

16. The OLT according to claim 15, wherein the calculated duration carried in the PLOAM message comprises a difference between a logical loop delay of the PON and an actual loop delay of the ONU when the buffer delay is less than a predetermined delay offset threshold, wherein the buffer delay of the OLT is substantially equal to the duration for storing the PTP message in the processing unit.

* * * * *